(12) United States Patent
Roberts (10) Patent No.: US 12,336,519 B1
(45) Date of Patent: Jun. 24, 2025

(54) FISH HOOK REMOVER

(71) Applicant: Lowell Roberts, Pell City, AL (US)

(72) Inventor: Lowell Roberts, Pell City, AL (US)

( * ) Notice: Subject to any disclaimer, the term of this patent is extended or adjusted under 35 U.S.C. 154(b) by 0 days.

(21) Appl. No.: 18/891,936

(22) Filed: Sep. 20, 2024

(51) Int. Cl.
*A01K 97/00* (2006.01)
*A61D 7/00* (2006.01)

(52) U.S. Cl.
CPC .............. *A01K 97/00* (2013.01); *A61D 7/00* (2013.01)

(58) Field of Classification Search
CPC ........... A01K 97/00; A01K 97/18; A61D 7/00
See application file for complete search history.

(56) References Cited

U.S. PATENT DOCUMENTS

| 2,215,772 | A | * | 9/1940 | Vecchia | A01K 85/16 |
|---|---|---|---|---|---|
| | | | | | 43/42.34 |
| 5,084,999 | A | | 2/1992 | Henry | |
| 6,138,401 | A | | 10/2000 | Duncan | |
| 7,818,914 | B1 | | 10/2010 | Baiamonte et al. | |
| 11,259,826 | B2 | | 3/2022 | Gearwar | |
| 11,272,698 | B1 | | 3/2022 | Pisano | |
| 2012/0060298 | A1 | * | 3/2012 | Campbell | B24D 15/06 |
| | | | | | 7/106 |
| 2012/0240448 | A1 | | 9/2012 | Kemble | |
| 2015/0045769 | A1 | * | 2/2015 | Cabrera Aquino | A61D 7/00 |
| | | | | | 604/117 |

FOREIGN PATENT DOCUMENTS

| AU | 2019101011 A4 | 10/2019 |
|---|---|---|
| BR | 1020130076206 B1 | 2/2022 |
| WO | 2005096812 A1 | 10/2005 |

OTHER PUBLICATIONS

Crazy Shark, Crazy Shark Stainless Steel Fish Hook Remover Hookout Hook Out 9.5in, Amazon.com, accessed Jul. 24, 2024, www.amazon.com/CrazyShark-Stainless-Steel-Remover-Hookout/dp/B0BYV87ZBQ/ref=sr_1_56?crid=1A3G76WM0KWGC&dib=eyJ2ljoiMSJ9.JUxl48aTTdCSBd4DypitcY8qTd31LpaVw6_RT3Sw TQn5Z4cBjh6tG8oU5D6dOXVZdQtkgqZ1pBlrU671AHaMKeSFo pZ6AppYSR-eGlbFgd2O4wf1FkBkq6diiqRrlSPYq3giVa_ QrOF1wuTqC-.

Ozark Trail, Ozark Trail Fishing Hook Disgorger—Red, Walmart. com, accessed Jul. 24, 2024, www.walmart.com/ip/Ozark-Trail-Fishing-Hook-Disgorger-Red/177350552?wmlspartner=wlpa &selectedSellerId=0&wl13=1800&adid=22222222277177350552_ 117755028669_12420145346&wl0=&wl1=g&wl2=c&wl3= 501107745824&wl4=pla-394283752452&wl5=1026339&wl6=&wl7= &wl8=&wl9=pla&wl10=8175035&wl11=local&wl12=177350552 &veh=sem_LIA&gad_source=1+.

* cited by examiner

*Primary Examiner* — Vi X Nguyen
(74) *Attorney, Agent, or Firm* — Thompson Patent Law Offices PC (57) ABSTRACT

Apparatus and associated methods relate to fish hook remover. The fish hook remover is configured to remove an embedded fish hook. The fish hook may, for example, extend along a fish hook puncture wound path and be barbed at its distal end. The fish hook remover may, for example, slidingly engage the fish hook. The fish hook remover may, for example, include a tubular body with an interior lumen extending from a proximal end to a distal end. The tubular body includes a proximal grip portion. The fish hook remover includes a distal head portion with a front sloped distal end configured to engage the barb of the fish hook during removal. Various embodiments may advantageously mate with the barb to permit retraction of the hook along the entry path without additional tearing of the flesh.

4 Claims, 7 Drawing Sheets

FISH HOOK REMOVER

TECHNICAL FIELD

Various embodiments relate generally to fishing and first-aid treatment pertaining to fishing injuries.

BACKGROUND

Fish hooks are tools designed for capturing aquatic organisms. Fish hooks may, for example, include one or more sharp, barbed point, which may be configured to secure engagement with a target. Fish hooks may, for example, be fabricated in various sizes, shapes, and materials to optimize performance across diverse fishing environments and species. Due to their sharpness and barbed design, fish hooks may, for example, pose a risk of accidental injuries to users, commonly resulting in puncture wounds. Such injuries may vary in severity, from superficial skin penetrations to deep tissue involvement, necessitating prompt and precise removal to prevent further trauma or infection.

Treatment of a fish hook injury may, for example, begin with assessing the depth, location, and severity of the wound. If the hook is superficially embedded and does not involve sensitive areas like the eyes, face, or joints, the fish hook may be removed using techniques such as the "string-yank" or "push-through" methods. Following removal, the wound may, for example, be cleansed with antiseptic solution to help prevent infection. A sterile dressing may, for example, be applied. For deeper injuries, and/or those involving vital structures, medical evaluation may, for example, be necessary to determine the need for local anesthesia, imaging, or surgical removal. Tetanus prophylaxis may be considered. Antiseptic may, for example, be prescribed if there is a high risk of infection. Continuous monitoring may, for example, be used for signs of infection or other complications to ensure proper healing and minimize long-term damage from the fish hook injury.

SUMMARY

Apparatus and associated methods relate to fish hook remover. The fish hook remover is configured to remove an embedded fish hook. The fish hook may, for example, extend along a fish hook puncture wound path and be barbed at its distal end. The fish hook remover may, for example, slidingly engage the fish hook. The fish hook remover may, for example, include a tubular body with an interior lumen extending from a proximal end to a distal end. The tubular body includes a proximal grip portion. The fish hook remover includes a distal head portion with a front sloped distal end configured to engage the barb of the fish hook during removal. Various embodiments may advantageously mate with the barb to permit retraction of the hook along the entry path without additional tearing of the flesh.

Various embodiments may achieve one or more advantages. The head portion may, for example, advantageously allow the head to slide based on grip inputs onto the barb. The distal head may, for example, advantageously slidingly engage with the barb to form a nested interface.

For example, some embodiments include an open interior diameter lumen of the tube-shaped body. The interior diameter lumen may, for example, advantageously allow an extension through the entire length of the device. The interior lumen may, for example, advantageously permit saline solution fluid to be injected into the wound via the grip lumen. The fish hook remover's extension over the fish hook may, for example, facilitating a smooth overlay over the hook. The grip area may, for example, advantageously ensure secure handling of the device while sliding along a shank and a bend of the fish hook. The grip area may, for example, ensure proper alignment and ease of use. The tube-shaped body may, for example, advantageously provide a streamlined design that minimizes resistance during the removal process. The fish hook remover device may, for example, advantageously adapt to different hook sizes and shapes, reducing the risk of additional tissue damage. The area where the pliable head nests against the hook barb may, for example, advantageously shield the barb such that, for example, inflicting further injury is avoided. A steeper slope on the backside of the device head in some embodiments may, for example, advantageously facilitate removal along the wound path while creating back pressure to aid in maintaining the head's position against the barb. Embodiments include a fish hook flexible seal and syringe integration system may, for example, advantageously allow for insertion of a fluid solution into the wound. The fish hook flexible seal and syringe system may, for example, enhance the post-removal treatment and reduce the risk of infection.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. To help introduce discussion of various embodiments, an exemplary fish hook remover is described in an illustrative use-case scenario with an exemplary method of removal with reference to FIGS. 1-3. Further discussion of exemplary associated parts and/or accessories of the fish hook remover are discussed with reference to FIGS. 4-9.

Figure 1:
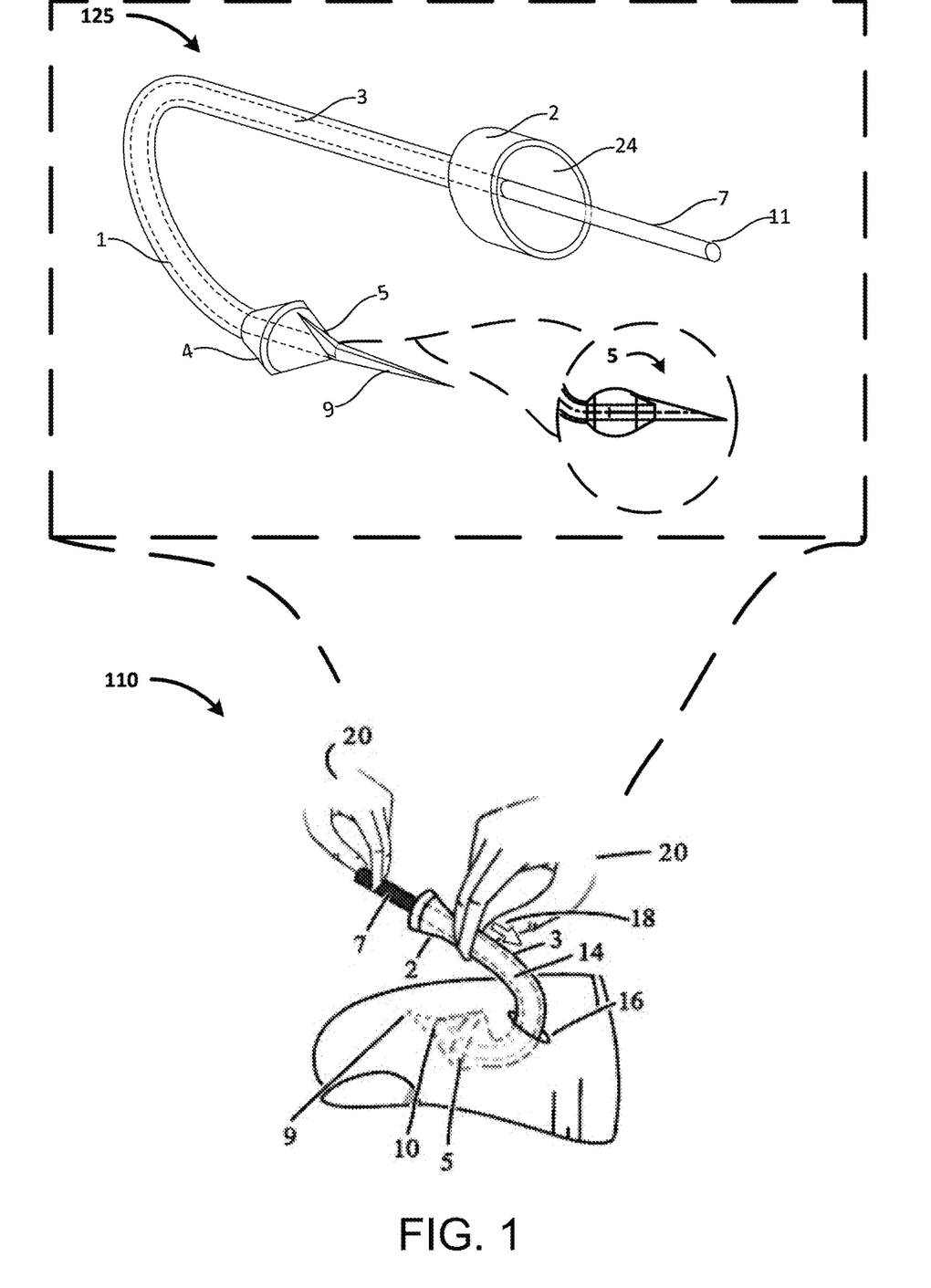
FIG. 1 depicts an exemplary fish hook remover employed in an illustrative use-case scenario.
Figure 2:
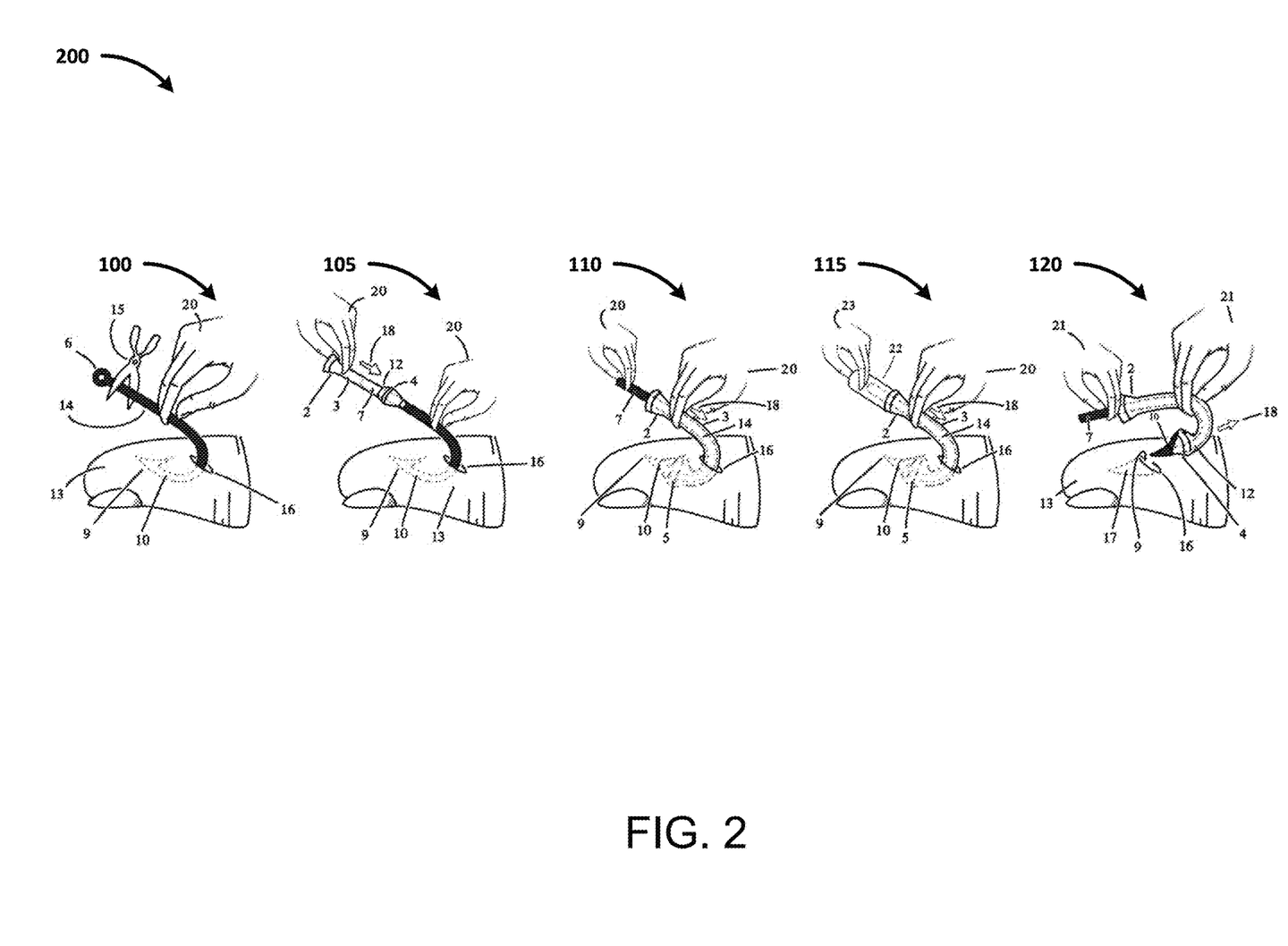
FIG. 2 depicts an exemplary method of operation of the fish hook remover.

FIGS. 1 and 2 depict an exemplary fish hook remover apparatus employed in an illustrative use-case scenario 110. The illustrative use-case scenario 110 includes a fish shank 7 being removed from a thumb.

FIG. 1 depicts an exemplary fish hook remover 125 as applied to the exemplary fish hook shank 7. The shank 7 includes a point 11 where the eye of the fish hook is removed, leaving as much of the fish hook shank as possible, in preparation for sliding the fish hook removal device over the hook. The fish hook includes a point 9. The point of the fish hook may, for example, be sharp. The point of the fish hook may, for example, tear through flesh.

The fish hook remover 125 includes an interior diameter lumen 1. The lumen may, for example, extend through the entire length of the tube-shaped body, allowing it to slide smoothly over the fish hook's shank and bend. This interior diameter may, for example, be manufactured in various sizes to flexibly engage with the hook to ensure a snug fit around various hook sizes, minimizing movement and maintaining alignment with the hook during removal, thereby reducing tissue damage and ensuring effective barb shielding.

The fish hook remover 125 includes a grip area 2. The grip area may, for example, be used by a user to aid in gripping and sliding the device along the shank and bend of the hook to facilitate the nesting of the device head against the hook barb. Fish hook remover 125 includes a cavity 24 in grip configured to receive the syringe. The syringe may, for example, be used to apply antiseptic and/or wound rinsing fluid.

The fish hook remover 125 includes a tube-shaped body of the device 3. The tube-shaped body of the device may, for example, be configured to slide (e.g., smoothly) over the fish hook's shank. The body may, for example, be configured to bend, conforming to the path of the shank as the body is disposed over the shank. Accordingly, the body may, for example, advantageously follow the original wound path, which may, for example, reduce tissue damage. The tube-shaped body of the device may, for example, be calibrated such that the interior diameter 1 provides a snug fit (e.g., a close sliding fitment), keeping the device aligned with the hook for secure barb shielding. The tube may, for example, advantageously provide a path for direct introduction of a fluid (e.g., liquid antiseptic and/or a saline solution) into the wound, which may advantageously enhance post-removal care.

The fish hook remover 125 includes a head 4. The head may, for example, be a pliable head of the fish hook remover device. The head may, for example, be configured to engage with the barb of the fish hook. The engagement of the head with the barb may, for example, advantageously contribute to a smooth removal of the hook while reducing or avoiding further damage to the flesh during retraction. The head may, for example, be curved. The head may, for example, be elliptical. The maximum diameter of the head may, for example, correspond to selected dimensions of a fish hook. Selected dimensions may, for example, include the height the barb extends above the hook bend.

The fish hook remover 125 includes an area 5 where the pliable device head nests against the hook barb to shield the barb. This may, for example, help prevent additional tissue damage during removal of the hook. The fish hook remover 125 includes a close-up view of the area 5.

The fish hook remover 125 includes a head 4. The head may, for example, be a slightly pliable head of the device. The head may, for example, extend slightly past the base of the barb of the hook toward the point of the fish hook 9. The head may, for example, nest against the barb along the nesting area 5. The of the fish hook may, for example, be height defined as the outermost radial extension of the barb from the path of the hook The head of the fish hook may, for example, may include a conical cross-section. The head may be configured as opposing conical structures. At least one end of the head may be a conical frustum. The head may, for example, have a maximum cross-sectional area bounded by a maximum diameter at least equal to a maximum height of the barb.

When the tubular body is laid flat such that the body extends along a longitudinal axis, the proximal portion of the head may be defined by a first angle relative to the longitudinal axis. The distal portion of the head may be defined by a second angle relative to the longitudinal axis. The second angle may, for example, be less than or equal to the first angle. In embodiments in which the first angle is greater than the second angle, the steeper angle of the proximal portion of the head may, for example, advantageously press the shallower distal portion of the head against the barb of the fish hook during translation of the hook and tubular body assembly in the proximal direction (e.g., withdrawing from the flesh).

Figure 3:
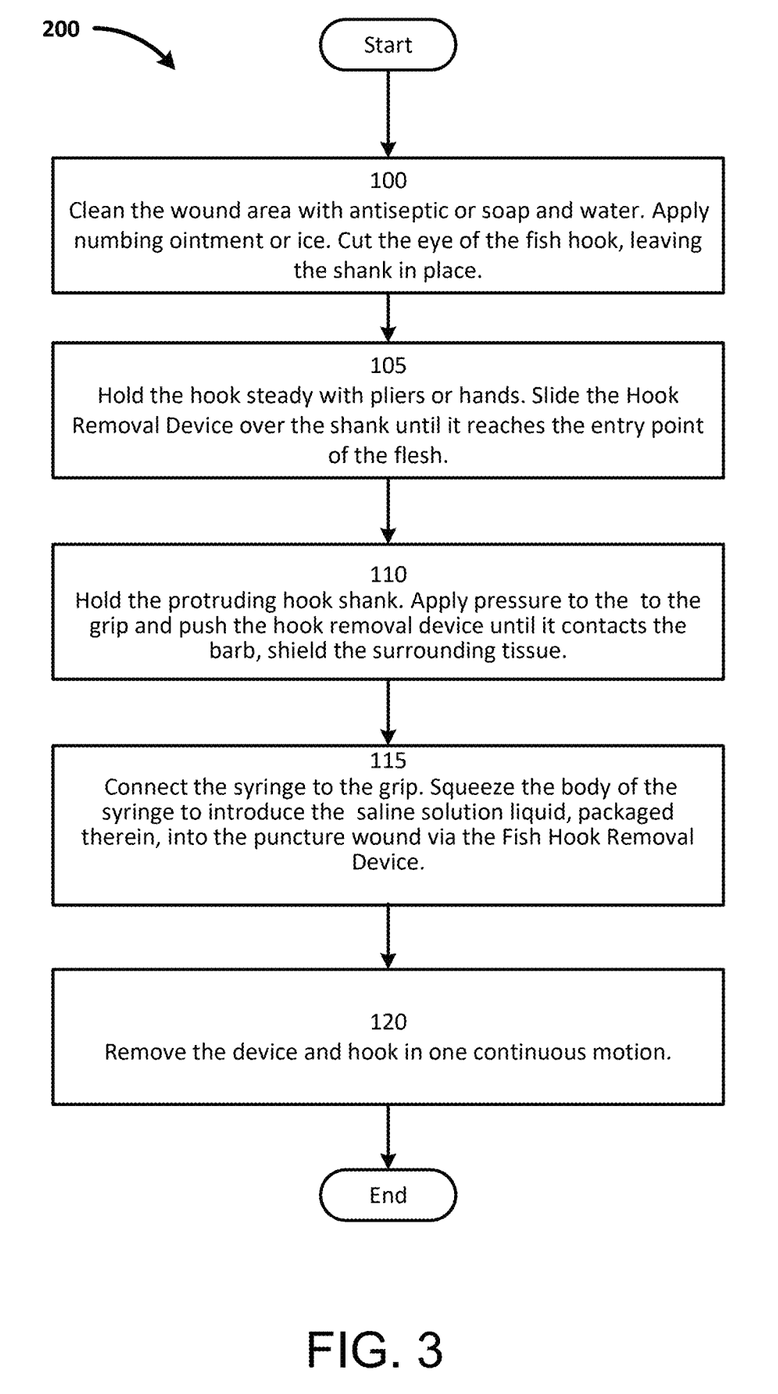
FIG. 3 depicts a flowchart of the exemplary method operation of the fish hook remover.

FIG. 2 depicts an exemplary method 200 of operation of the fish hook remover. FIG. 3 depicts a flowchart of the exemplary method 200 of operation of the fish hook remover. The method 200 includes an illustrative use-case depiction 100. The illustrative use-case scenario 100 includes a patient's impaled body part 13. The impaled body part may, for example, include a patient's thumb. The illustrative use-case scenario 100 includes a fish hook 14. The fish hook may, for example, include a barbed fish hook. The illustrative use-case scenario 100 includes a point of entry into wound 16. The point of entry may, for example, include the region where the fish hook shank protrudes from the impaled body part.

The illustrative use-case depiction 100 includes the hands 20 of the person and/or user of the removal method aiding the victim by sliding the hook removal device over the fish hook. The fish hook includes the point 9 of the fish hook. The illustrative use-case depiction includes the eye 6 of the fish hook. The eye 6 of the fish hook is being cut with a metal cutting device 15.

For context, the eye of a fishing hook may, for example, be used to secure the hook to the line, allowing it to be cast into the water and providing a strong connection point for reeling in fish once they are hooked. The fish hook eye may, for example, help maintain the proper alignment and presentation of bait and/or lures during fishing.

The metal cutting device may, for example, include cutting scissors. The cutting scissors may, for example, include metal cutting scissors. The metal cutting device may, for example, include wire clippers. The illustrative use-case scenario 100 includes a patient's impaled body part 13. The impaled body part may, for example, include a patient's thumb. The illustrative use-case scenario 100 includes a fish hook 14. The fish hook may, for example, include a barbed fish hook.

The illustrative use-case scenario 100 includes a point of entry into wound 16. The point of entry may, for example, include the region where the fish hook shank protrudes from the In step 100, the user removing the fish hook may, for example, clean the wound with antiseptic or soap and water. The user may, for example, apply numbing ointments and/or ice to the wound to reduce the level of pain caused by the puncture wound during the hook removal process. The user may, for example, cut off the eye of the fish hook, leaving the shank in place.

The exemplary method 200 includes an illustrative use-case depiction 105. The illustrative use-case depiction shows the application of the hook removing device after cutting off the eye. In some implementations, the fish hook remover may slide over the eye, and the method may not include cutting off the eye. The illustrative-use case depiction 105 includes a steeper slope 12 on the back side of the head 4 of the hook removal device. The steeper slope 12 may, for example, allow for easing the removal of the device and the hook back along the path of the wound created by the barbed fish hook. The steeper slope 12 may, for example, create some back pressure which aids in keeping the device head nested against the hook barb as the device and hook are removed from the wound.

The illustrative-use case scenario 105 includes a direction of movement 18 to slide the hook removal device over the shank and bend of the fish hook.

In step 105 of the exemplary fish hook method 200, the user holds the hook steady with pliers and/or hands. The user slides the hook removal device over the shank until it reaches the entry point 16 of the flesh.

As depicted, the method 200 includes an illustrative use-case depiction 110, as depicted in FIGS. 1-3. In step 110, the user holds the protruding hook shank. The user applies pressure to the to the grip. The user pushes the hook removal device into the puncture wound until it contacts the barb, shielding the surrounding tissue.

In this example, the exemplary method 200 includes an illustrative use-case depiction 115, as depicted in FIGS. 1-3. The use-case depiction 115 includes the hands 23 of the person applying a saline solution fluid stored in the reservoir of the syringe 22. into the puncture wound of the patient during the process of removing the fish hook just prior to the removal of the hook removal device and fish hook from the wound. The user may, for example, inserting the syringe 22 into the grip 2 of the fish hook removal device and squeezing the body of the syringe to introduce the saline solution liquid, packaged therein, into the puncture wound via the fish hook remover device grip cavity 24.

In step 115, the user connects the syringe to the grip. The user squeezes the body of the syringe to introduce the saline solution liquid, packaged therein, into the puncture wound via the fish hook removal device.

As shown, the method 200 includes an illustrative use-case depiction 120, as depicted in FIGS. 1-3. In step 120 the user removes the device and hook in one continuous motion. The user may, for example, then clean, bandage the wound and dispose of used devices properly. A patient may, for example, then seek medical attention if needed.

The fish hook remover 125 is depicted covering a fish hook. The barbed fish hook includes a shank 7. The shank 7 includes a point 11 where the eye of the fish hook is removed, leaving as much of the fish hook shank as possible, in preparation for sliding the hook removal device over the hook.

Figure 4:
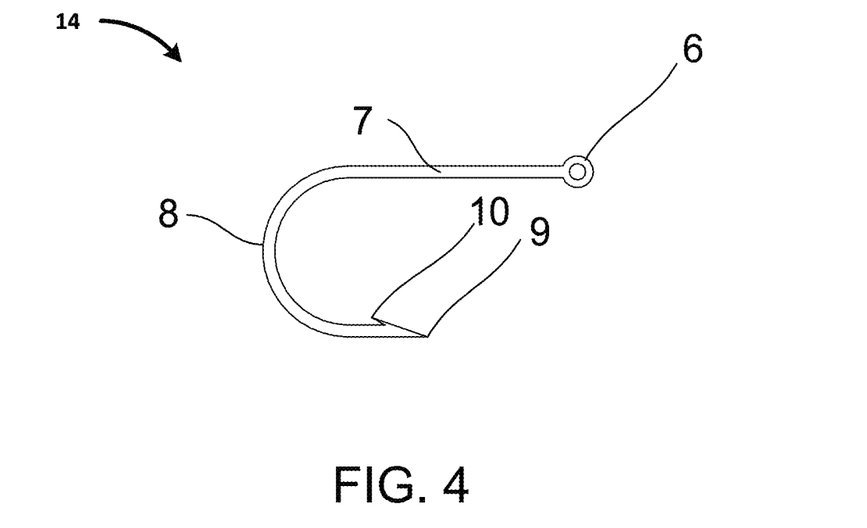
FIG. 4 depicts a fish hook accessory.

FIG. 4 depicts a fish hook accessory 14. The fish hook accessory 14 includes an eye of fish hook 6. The fish hook 14 includes the shank 7. The barbed fish hook 14 includes a bend portion 8 of a fish hook. The barbed fish hook 14 includes point 9 of the fish hook. The barbed fish hook includes a barb 10.

Figure 5:
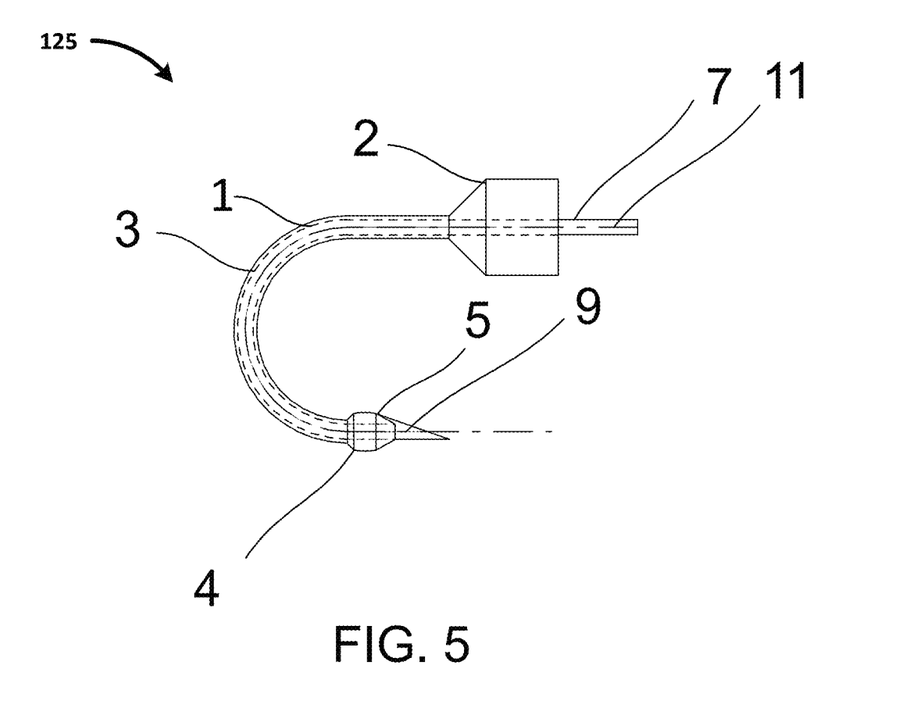
FIG. 5 depicts a fish hook remover used in connection with a fish hook.

FIG. 5 depicts a fish hook remover 125 used in connection with the fish hook 14. The fish hook remover 125 depicts the inclusion of an open interior diameter 1 of the device's tube-shaped body which extends through the entire length of the device. The fish hook remover 125 includes a grip area 2. This area of the device aids in gripping and sliding the device along the shank and bend of the hook to facilitate the nesting of the device head against the hook barb. The fish hook remover 125 includes a tube-shaped body 4 of the device. The fish hook remover 125 includes a head 4 of the device. The head may, for example, be a slightly arrowhead shaped. The head 4 of the fish hook remover may, for example, be pliable. The fish hook remover 125 includes an area 5 where the pliable device head nests against the hook barb to shield the barb and help prevent additional tissue damage during removal of the hook.

Figure 6:
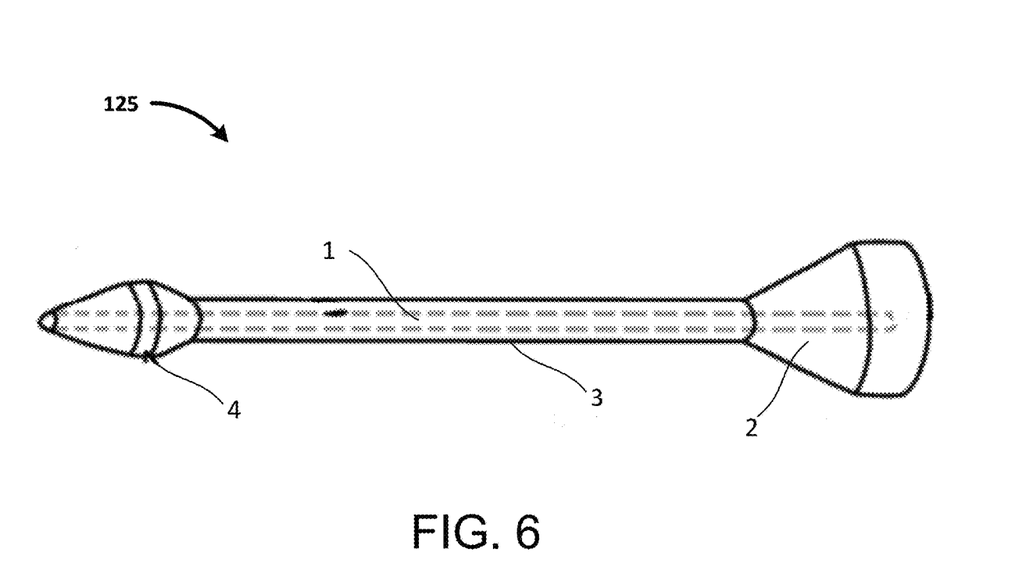
FIG. 6 depicts a side perspective view of the fish hook remover
Figure 7:
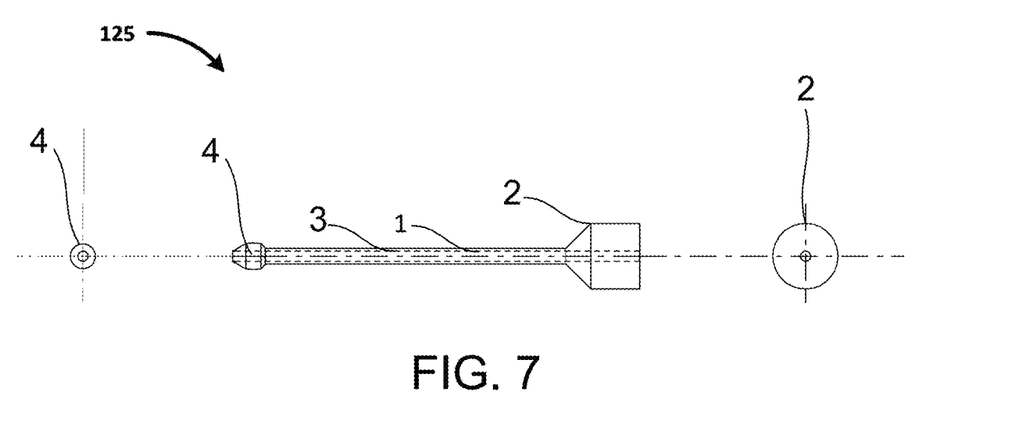
FIG. 7 depicts a front, back, and side view of the exemplary fish hook remover.
Figure 8:
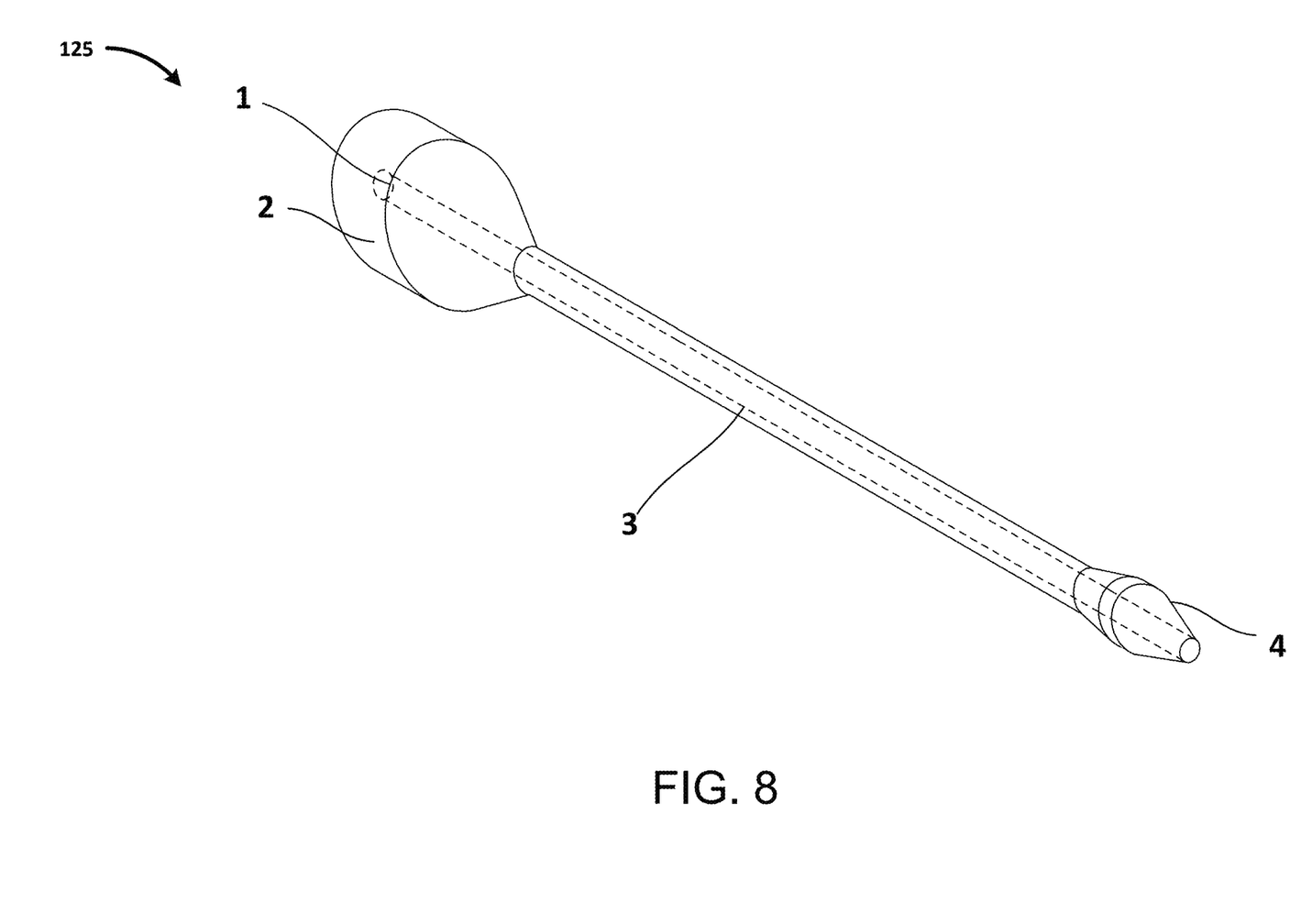
FIG. 8 depicts an isometric view of the fish hook remover

FIG. 6 depicts a side perspective view of the fish hook remover 125. FIG. 7 depicts a front, back, and side view of the exemplary fish hook remover. FIG. 8 depicts an isometric view of the fish hook remover In some embodiments, the fish hook remover may, for example, include a hollow flexible tube 3 body with a slightly arrow shaped, pliable "head" 4 at one end and an enlarged area for easier gripping 2 at the opposite end. This fish hook remover may, for example, slide over the shank 7 of the fish hook, following the bend of the hook 8 along the entry path created by the barbed fish hook and lets the device head 4 to come to rest at the point where the base of the barb joins the hook point 5. The slightly arrowhead shaped, tapered head 4 of the device comes to rest against the hook barb 10, shielding the barb 5 and protecting the surrounding tissue from being damaged by the barb as the hook is carefully removed along the original entry path, greatly reducing the possibility of additional damage to the surrounding tissue, blood vessels, arteries, and/or tendons.

In some embodiments, a user may, for example, assess the injury to determine if this injury is near the eyes, mouth, large arteries, joints or genitalia, any one of which should be considered a more serious injury that should be treated by a qualified medical professional. If the injury is considered a more serious injury, stabilize the hooks if possible and seek medical assistance immediately.

After assessment determines that this is not a serious injury. The user may, for example, determine if there are additional hooks that need to be isolated and/or covered to prevent additional injuries.

The user may, for example, remove the embedded hook from any lure or fishing line, being careful not to further embed the hook.

The user may, for example, use a metal cutting device (side cutter, mini-bolt cutter, etc.) remove the eye 6 from the hook shank 11 or if the embedded hook is part of a double or treble type hook, cut the embedded portion of the double or treble hook as near the point the treble hooks are joined as possible, leaving as much of the hook shaft 7 as possible in place.

The user may, for example, thoroughly clean the skin around the area where the hook penetrated the skin using soap and water, rinsing completely or, if possible, a sterile, antiseptic cleansing wipe. If available, an application of a surface numbing ointment or ice to the area of wound for a few minutes would help to reduce the pain level of the wound while being treated.

The user may, for example, determine the proper device size to use by choosing the device to best fit the diameter of the hook shank. Choose the device that is a snug fit but loose enough that the device slides easily and smoothly over the shank of the hook 7. Do not use a device size that needs to be forced over the hook shank 7. Hold the shank of the hook steady while sliding the device over the shank of the hook 7. When available, sanitized needle nosed pliers or similar devices can be used to aid in holding the hook shank 7 steady. When the device head 4 reaches the point the hook entered the flesh, apply the necessary additional amount of pressure to let the device head 4 penetrate the wound, and advance the device along the hook until the head 4 of the device comes to rest at the point where the barb 10 joins the point of the hook 9. When the device is placed in this position, the slightly arrow shaped, pliable head 4 of the device may, for example, nest and shield the barb 5 to prevent the hook barb from causing additional tissue damage as the hook is removed.

The user may, for example, carefully and gently remove the hook and device by following the original wound path.

The user may, for example, clean the wound area again, cover with a sterile bandage and contact a medical professional as soon as possible for a follow-up inspection and to review the need for additional cleaning, antiseptic and/or a tetanus vaccination. Fish hooks may, for example, be inherently very un-sanitary and are frequently rusted. Extra care should be exercised to prevent infection during the healing period.

The user may, for example, dispose of the device used for removing the hook. The fish hook remover may, for example, be a sterile, one-use product. The fish hook remover may, for example, be intended for reuse. If more than one device was removed from the sterile packaging, dispose of all opened devices.

In some embodiments, the device may, for example, be manufactured using a pliable, non-toxic material that is capable of being formed using an injection of said material into a mold, thereby forming the device into a formed, self-contained product. Due to the wide array of barbed fish hook types and sizes available, there may, for example, be an array of different of device sizes featuring graduated interior diameters of the tube body 3 and overall length of the tube 3 body to accommodate the various barbed hook types and sizes.

Figure 9:
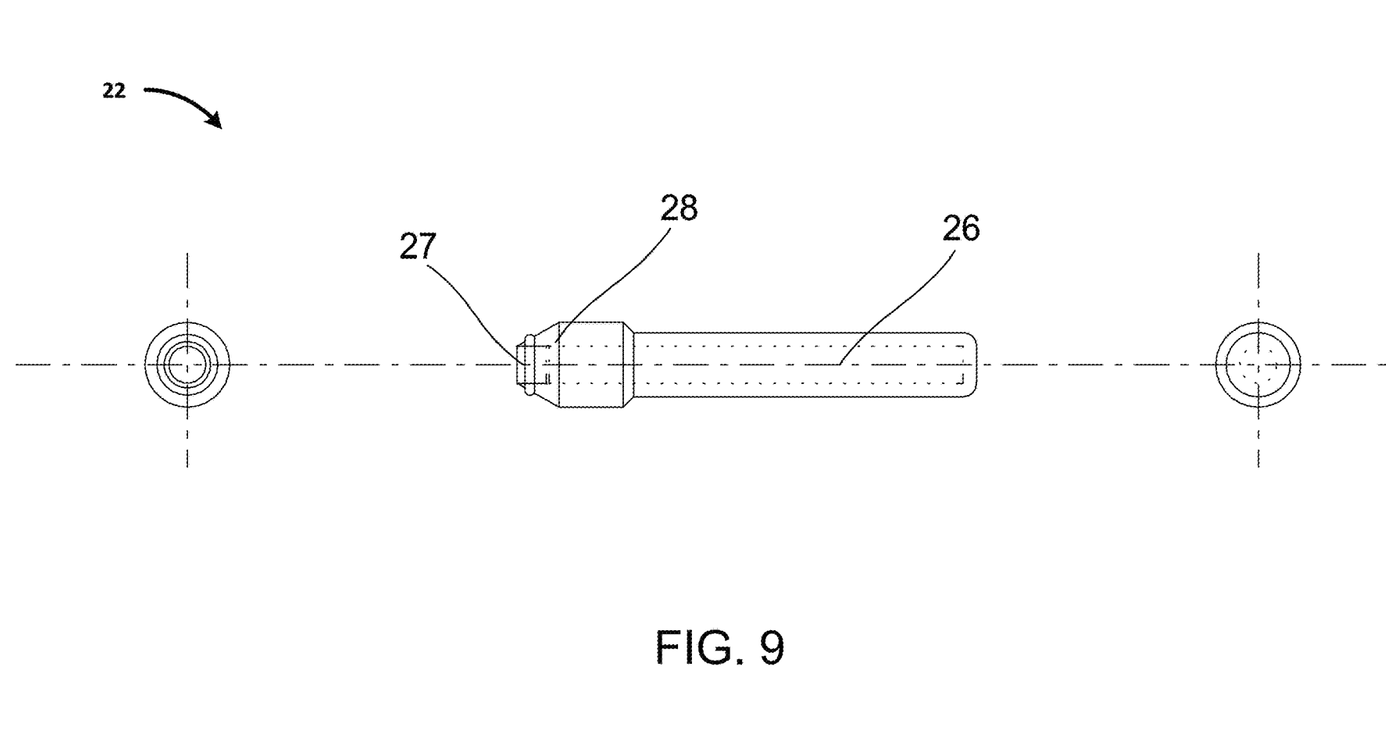
FIG. 9 depicts an exemplary syringe accessory.

FIG. 9 depicts an exemplary syringe 22 accessory which contains a liquid storage reservoir 26. The syringe liquid storage reservoir may, for example, hold saline solution liquids for direct application into a wound during the fish hook removal process. The storage reservoir may, for example, provide a controlled volume of liquid, ensuring precise dosing and reducing the risk of spillage. The reservoir's integration with the fish hook removal device allows for seamless introduction of the liquid through the tube and into the puncture wound, enhancing wound care by minimizing infection risk and promoting faster healing.

The exemplary syringe 22 includes a flexible raised, half-round flexible seal 27 that is configured to fit into a recessed, half-round groove of equal size in the cavity of grip portion of the fish hook removal device. This seal may, for example, prevent the saline solution liquid from leaking at the connection point in the grip portion of the fish hook removal device and the syringe.

The exemplary syringe 22 includes a twist off type seal 28. After removing the twist off seal, the syringe may, for example, be inserted into the grip after which the fluid solution liquid stored in the syringe reservoir may, for example, be introduced into the puncture wound via the fish hook removal device. This seal is designed to retain the liquid in the reservoir until the syringe is inserted into the grip portion of the fish hook removal device.

Although various embodiments have been described with reference to the figures, other embodiments are possible.

Although an exemplary system has been described with reference to FIGS. 1-9, other implementations may be deployed in other industrial, scientific, medical, commercial, and/or residential applications.

In some embodiments, the fish hook remover may, for example, be used to aid in the removal of barbed fish hooks from human flesh while reducing damage to surrounding tissue. The fish hook remover may, for example, be used to aid in human hook removal. The fish hook remover may, for example, be used in connection to other animals. The animals may, for example, include dogs. The animals may, for example, include cats. The animals may, for example, include birds.

In some embodiments, the fish hook remover may, for example, be used instead of using a push-through technique. The fish hook remover may, for example, be less painful and much less likely to harm nearby tissue, arteries, bones, joints or nerves since it allows the hook to be removed slowly and carefully along the path of the original wound while the barb is shielded to help prevent additional damage. For context, the "push-thru technique" requires that the inserted hook be manually forced further through the flesh until the barbed portion is revealed, then either bending the barb down against the hook to make the barb ineffective or cutting off the barbed portion and removing the shaft of the hook along the original entry path. This method, aside from being very painful and requiring a great amount of courage on the part of the patient or the person assisting, could cause additional damage by hitting an artery, bone, joint, nerve or other unknown obstacle. This method increases the pain level and damage to surrounding tissue and possible unseen tendons, arteries, etc.

In some embodiments, the fish hook remover may, for example, be used instead of using a string-yank technique. The fish hook remover may, for example, be less painful and much less likely to harm nearby tissue, arteries, bones, joints or nerves since it allows the hook to be removed slowly and carefully along the path of the original wound while the barb is shielded to help prevent additional damage than the strip yank technique. For context, the "string-yank technique" which requires that a length of string or fishing line be attached to the embedded fish hook near the point where the hook entered the flesh and while pushing downward on the hook shank, getting a firm hold on the string/fishing line and quickly yanking the hook back out along the entry path. This technique may, for example, be better and less painful than the "push-thru technique" but is still, in most cases quite painful and could, depending on location, tear nearby tissue, arteries, nerves and/or organs. During research, incidents of people being injured by the "yanked out" hook flying wild and impacting others in the area were found.

In some embodiments, the fish hook remover may, for example, be used instead of using a needle-cover method for rapid treatment. The needle-cover method may, for example, be limited, for example to medical facilities. For context, needle cover method" which requires injecting local anesthesia in the wound area, then inserting a hypodermic needle into the wound caused by the embedded fish hook until the hook barb is located and the needle beveled opening is placed over the hook barb. The hook can then be withdrawn while the hook barb is enclosed in the needle beveled opening to help prevent additional damage to surrounding tissue. This method would almost certainly be performed by a medical professional.

In medical applications, the microbial may, for example, include an antiseptic agent(s). The antimicrobial may, for example, include an antibiotic agent(s). The antimicrobial may, for example, include an antifungal agent(s). The antimicrobial may, for example, include an antiviral agent(s).

In medical applications, the tip of syringe may, for example, be configured as a male luer lock and/or luer slip fitting. The grip cavity may, for example, be configured as a female luer lock and/or luer slip fitting.

In medical applications, the saline solution may, for example, include a normal saline composition In some embodiments, the fish hook remover may, for example, be used instead of using a qualified surgeon for rapid treatment. The assistance of a qualified surgeon may, for example, be limited, for example to medical facilities. For context, a qualified surgeon may, for example, remove a fish hook with concern of the possibility of unknown arteries, bone, joints, nerves, etc. in the affected area and the ability of the medical profession to more thoroughly clean the wound to prevent infection. The downside to this option is the fact that most fish hook accidents happen in areas very remote from any medical facility making timely aid difficult.

In industrial applications, the fish hook remover can be used in environments such as commercial fishing operations or aquaculture facilities, where workers are at higher risk of fish hook injuries due to frequent handling of hooks and lines. The device offers a quick and effective solution for removing embedded hooks, reducing downtime and minimizing the need for professional medical intervention, which may be important in remote or offshore locations.

In scientific applications, the fish hook remover may be utilized in research settings, particularly in studies involving fish tagging or monitoring, where researchers need to safely remove hooks from captured specimens without causing additional harm. The fish hook remover design allows for precise and careful removal, preserving the health of the fish and ensuring the integrity of the research data.

In medical applications, the device can be used by healthcare providers in emergency rooms, urgent care centers, or remote clinics to quickly and safely remove barbed fish hooks from patients. The fish hook remover's ability to shield the barb and minimize tissue damage during removal can reduce pain, lower the risk of complications, and improve patient outcomes, particularly in areas where access to specialized care is limited.

In commercial and residential applications, the fish hook remover may, for example, be useful for anglers, outdoor enthusiasts, and fishing guides who may encounter fish hook injuries during recreational activities. The fish hook remover may, for example, be used as a practical tool for safely addressing minor injuries on-site, allowing for immediate care without requiring emergency services, and promoting a safer fishing experience.

In commercial-first aid applications, the fish hook remover may, for example, be included in fishing first aid kits provides a tool for businesses and fisherman where hook-related injuries are a common risk. The kit may, for example, include the fish hook removal device. The kit may, for example, include syringes loaded with antiseptic/saline solution liquids. The kit may, for example, include antiseptic wipes. The kit may, for example, include a small cutting tool. The kit may, for example, include sterile gloves. The kit may, for example, include sterile bandages. The kit may, for example, include gauze pads. The kit may, for example, include adhesive bandages. The kit may, for example, include medical tape. The kit may, for example, include pain-relief ointment and/or numbing agent. The kit may, for example, include an instruction manual including a method of operation for the fish hook remover.

In some embodiments the fish hook remover may, for example, be modified to remove other sharp instruments. Such instruments may, for example, include a medical device.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A human fish hook remover comprising:
 a tubular body having an interior lumen extending from a proximal end to a distal end, and configured to be slidingly disposed over and conformed to a path of a fish hook; and,
 a head portion at the proximal end of the tubular body, the head portion having a decreasing cross-sectional area in a direction toward the distal end such that the head portion is configured to engage under a barb of the fish hook that is configured to be embedded in human flesh when the head portion is slid along the path of the fish hook and lodged under the barb effectively nesting along a length and height of the barb of the hook and thus protecting surrounding tissue from additional trauma;
 wherein the head portion further comprises a monotonically increasing backside such that the head portion creates a back pressure associated with the lumen of the tubular body; and,
 the head portion comprises an arrowhead shape configured such that a front of the arrowhead shape nests against the barb of the fish hook to shield the fish hook barb by forming a nested interface.

2. The human fish hook remover of claim 1, further comprising an enlarged grip portion disposed at a proximal end.

3. The human fish hook remover of claim 1, wherein the head portion is configured to travel along a fish hook shank and wedge between the fish hook and the human flesh in which the fish hook is disposed.

4. The human fish hook remover of claim 1, wherein the head portion is sufficiently pliable that the head portion conforms to the path of the fish hook as the tubular body is slidingly advanced along the path of the fish hook.

* * * * *